US010679130B2

(12) United States Patent
Pinel et al.

(10) Patent No.: US 10,679,130 B2
(45) Date of Patent: *Jun. 9, 2020

(54) GROUP GENERATION USING SETS OF METRICS AND PREDICTED SUCCESS VALUES

(71) Applicant: International Business Machines Corporation, Armonk, NY (US)

(72) Inventors: Florian Pinel, New York, NY (US); Krishna C. Ratakonda, Yorktown Heights, NY (US); Lav R. Varshney, Champaign, IL (US); Dashun Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 719 days.

This patent is subject to a terminal disclaimer.

(21) Appl. No.: 15/399,210

(22) Filed: Jan. 5, 2017

(65) Prior Publication Data

US 2017/0116525 A1    Apr. 27, 2017

Related U.S. Application Data

(63) Continuation of application No. 14/612,698, filed on Feb. 3, 2015, now Pat. No. 9,619,434.

(51) Int. Cl.
*G06N 3/12* (2006.01)
*G06F 17/16* (2006.01)
(Continued)

(52) U.S. Cl.
CPC ............ *G06N 3/126* (2013.01); *G06F 17/16* (2013.01); *G06N 7/005* (2013.01); *G06N 20/00* (2019.01);
(Continued)

(58) Field of Classification Search
CPC ...... G06F 17/16; G06Q 10/04; G06Q 10/063; G06Q 10/0631; G06Q 10/063118;
(Continued)

(56) References Cited

U.S. PATENT DOCUMENTS 8,560,333 B2    10/2013  Andino, Jr. et al.
9,619,434 B2 *   4/2017  Pinel ..................... G06N 3/126
(Continued)

FOREIGN PATENT DOCUMENTS

GB            2472479 A  *  2/2011  ............ G06Q 10/06

OTHER PUBLICATIONS

Mazur, et al. "A task-member assignment model for complex engineering projects." International Journal of Industrial and Systems Engineering 7.1 (2011): pp. 1-25 (Year: 2011).*
(Continued)

*Primary Examiner* — Kamran Afshar
*Assistant Examiner* — Randall K. Baldwin
(74) *Attorney, Agent, or Firm* — Robert Bunker; Ryan, Mason & Lewis, LLP (57) ABSTRACT

A method includes receiving a set of parameters for a given project and generating, using information from a knowledge database, a plurality of combinations of group members based at least in part on the set of parameters. The method also includes evaluating a set of metrics for each of the combinations of group members, the set of metrics comprising at least one novelty metric and at least one collective intelligence metric. The method further includes generating one or more strategy matrices for each of at least a subset of the combinations of group members using information from the knowledge database, evaluating the combinations of group members in the subset using the strategy matrices to determine respective predicted success values, and selecting a given one of the combinations of group members for the
(Continued)

given project based at least in part on the sets of metrics and predicted success values.

20 Claims, 6 Drawing Sheets (51) Int. Cl.
*G06Q 10/06* (2012.01)
*G06Q 10/04* (2012.01)
*G06Q 10/10* (2012.01)
*G06N 20/00* (2019.01)
*G06N 7/00* (2006.01)

(52) U.S. Cl.
CPC ........... *G06Q 10/04* (2013.01); *G06Q 10/063* (2013.01); *G06Q 10/0631* (2013.01); *G06Q 10/063118* (2013.01); *G06Q 10/105* (2013.01); *G06Q 10/1097* (2013.01)

(58) Field of Classification Search
CPC ............. G06Q 10/105; G06Q 10/1097; G06N 99/005; G06N 3/126; G06N 7/005; G06N 20/00
See application file for complete search history.

(56) References Cited

U.S. PATENT DOCUMENTS

| | | | |
|---|---|---|---|
| 2004/0064354 A1* | 4/2004 | Dietrich | G06Q 10/06 705/7.14 |
| 2008/0227063 A1 | 9/2008 | Kenedy et al. | |
| 2009/0043621 A1* | 2/2009 | Kershaw | G06Q 10/06 705/7.16 |
| 2011/0071875 A1* | 3/2011 | Stenhaug | G06Q 10/0637 705/7.36 |
| 2012/0035972 A1 | 2/2012 | Ma et al. | |
| 2012/0290359 A1* | 11/2012 | Graham | G06Q 10/10 705/7.32 |
| 2013/0006685 A1 | 1/2013 | Kelkar et al. | |
| 2013/0110578 A1 | 5/2013 | Simon | |
| 2013/0132093 A1 | 5/2013 | Gross | |
| 2014/0297837 A1 | 10/2014 | Agarwal et al. | |

OTHER PUBLICATIONS

Gupta, Sangita. "Empirical study on selection of team members for software projects—data mining approach." International Journal of Computer Science and Informatics, ISSN: 2231-5292, vol. 3, Issue-2, 2013, pp. 97-102. (Year: 2013).*

E. Jaho et al., "ISCoDe: A Framework for Interest Similarity-Based Community Detection in Social Networks," Third International Workshop on Network Science for Communication Networks (INFOCOM-NetSciCom), Apr. 2011, pp. 929-934, Shanghai, China.

Disclosed Anonymously, "Social Data Analysis as Unobtrusive Measure for Validating Human Behavior or Assessment Test (Psychometric) Results," IPCOM000208050D, Jun. 2011, 10 pages.

D. Edwards et al., "Enabling Smarter Government with Analytics to Streamline Social Services," IBM Information Management Software, ibm.com/redbooks, Jul. 2012, 184 pages.

A.W. Woolley et al., "Evidence for a Collective Intelligence Factor in the Performance of Human Groups," Science, www.sciencemag.org, Oct. 2010, pp. 686-688, vol. 330.

Toby Marshall Egan, "Creativity in the Context of Team Diversity: Team Leader Perspectives," Advances in Developing Human Resources, May 2005, pp. 207-225, vol. 7, No. 2.

List of IBM Patents or Patent Applications Treated as Related.

* cited by examiner

| ROLE | NUMBER OF PEOPLE |
|---|---|
| PROJECT MANAGER | 1 |
| ARCHITECT | 2 |
| JAVA DEVELOPER | 4 |
| UI DESIGNER | 3 |

FIG. 5

| POSITION | NUMBER OF PLAYERS |
|---|---|
| GOALKEEPERS | 1 |
| FORWARDS | 4 |
| DEFENDERS | 3 |
| MIDFIELDERS | 3 |

FIG. 6

| BEHAVIOR PATTERN | ROLE 1 | ROLE 2 | ... | ROLE n |
|---|---|---|---|---|
| CREATIVE | 1 | 0 | ... | 0 |
| INSPIRATIONAL | 1 | 1 | ... | 0 |
| PERSUADER | 0 | 0 | ... | 1 |
| INVESTIGATOR | 0 | 1 | ... | 0 |

FIG. 7

| SKILL LEVEL | ROLE 1 | ROLE 2 | ... | ROLE n |
|---|---|---|---|---|
| NO EXPERIENCE | 1 | 0 | ... | 1 |
| SOME EXPERIENCE | 1 | 2 | ... | 0 |
| A LOT OF EXPERIENCE | 0 | 0 | ... | 1 |
| EXPERT | 0 | 1 | ... | 1 |

| | GOAL | FORWARD 1 | FORWARD 2 | MIDFIELDER 1 | MIDFIELDER 2 |
|---|---|---|---|---|---|
| GOAL | 0 | 0 | 0 | 0 | 0 |
| FORWARD 1 | 1 | 0 | 1 | 1 | 0 |
| FORWARD 2 | 1 | 3 | 0 | 0 | 2 |
| MIDFIELDER 1 | 0 | 1 | 0 | 0 | 0 |
| MIDFIELDER 2 | 0 | 0 | 2 | 0 | 0 |

GROUP GENERATION USING SETS OF METRICS AND PREDICTED SUCCESS VALUES

CROSS-REFERENCE TO RELATED APPLICATION

This application is a Continuation of U.S. patent application Ser. No. 14/612,698, filed on Feb. 3, 2015, the disclosure of which is incorporated herein by reference in its entirety.

BACKGROUND

The present application relates to computational creativity, and more specifically, to group generation for a project. Groups or teams are commonly used in a variety of contexts. For example, many businesses and other entities assign different projects or tasks to teams of employees. As another example, a sports team attempts to draft, sign and trade for players to compete for a championship or tournament. A coach of the sports teams may also select different lineups of players on the team to match up with specific opponents or to implement a particular playing style. A group or team generally requires a combination of members having the requisite skills and team cohesion to achieve the objectives of the project.

SUMMARY

According to one embodiment of the present invention, a method comprises receiving a set of parameters for a given project, generating, using information from a knowledge database, a plurality of combinations of group members based at least in part on the set of parameters, evaluating a set of metrics for each of the combinations of group members, the set of metrics comprising at least one novelty metric and at least one collective intelligence metric, generating one or more strategy matrices for each of at least a subset of the combinations of group members using information from the knowledge database, evaluating the combinations of group members in the subset using the strategy matrices to determine respective predicted success values, and selecting a given one of the combinations of group members for the given project based at least in part on the sets of metrics and predicted success values. The method is performed by at least one processing device comprising a processor coupled to a memory.

According to another embodiment of the invention, an article of manufacture comprises a computer readable storage medium for storing computer readable program code. The computer readable program code, when executed, causes a computer to receive a set of parameters for a given project, to generate, using information from a knowledge database, a plurality of combinations of group members based at least in part on the set of parameters, to evaluate a set of metrics for each of the combinations of group members, the set of metrics comprising at least one novelty metric and at least one collective intelligence metric, to generate one or more strategy matrices for each of at least a subset of the combinations of group members using information from the knowledge database, to evaluate the combinations of group members in the subset using the strategy matrices to determine respective predicted success values, and to select a given one of the combinations of group members for the given project based at least in part on the sets of metrics and predicted success values.

According to another embodiment of the invention, an apparatus comprises a memory and a processor device operatively coupled to the memory. The processor device is configured to implement an input module configured to receive a set of parameters for a given project, a group generation module configured to generate, using information from a knowledge database, a plurality of combinations of group members based at least in part on the set of parameter, a group evaluation module configured to evaluate a set of metrics for each of the combinations of group members, the set of metrics comprising at least one novelty metric and at least one collective intelligence metric, a strategy matrix module configured to generate one or more strategy matrices for each of at least a subset of the combinations of group members using information from the knowledge database, a success prediction module configured to evaluate the combinations of group members in the subset using the strategy matrices to determine respective predicted success values, and a group selection module configured to select a given one of the combinations of group members for the given project based at least in part on the sets of metrics and predicted success values.

These and other embodiments of the invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for group generation. However, it is to be understood that embodiments of the invention are not limited to the illustrative methods, systems and devices described but instead are more broadly applicable to other suitable methods, systems and devices.

Embodiments of the invention provide systems, devices and methods which allow for generation of combinations of group members as well as selection of a given combination of group members for a given project. Sets of metrics and predicted success values are used for selecting the given combination of group members. The sets of metrics include novelty metrics and collective intelligence metrics. The predicted success values are determined at least in part by evaluating strategy matrices generated for respective combinations of team members.

Groups or teams are used in many different contexts. For the purposes of illustration, various features of embodiments of the invention are described below in the context of an enterprise team and a sports team. It is important to note, however, that embodiments of the invention are not limited to these contexts. Instead, group generation and selection may be used in a variety of other contexts. A non-exhaustive list of such other contexts includes grouping students for collaborative assignments, organizing students into different classes, assigning individuals to different projects, assigning employees to different divisions of an entity, etc.

A given project typically has one or more objectives. Selecting a group or team for a given project involves selecting a combination of group or team members who have the right sets of skills and experience that can work together collectively to achieve the project objectives. When composing teams, one option is to select a group of individuals that has worked as a team in the past. A drawback of this approach, however, is that such a team is less likely to break existing habits to produce novel, and potentially better, results for achieving the objectives of a given project. Embodiments of the invention provide techniques for generating and selecting a group or team for a given project, where the group or team includes at least some members that haven't worked together in the past but have the required skills and will work in synergy with one another.

Various embodiments of the invention utilize a knowledge database, which contains information on available team members and past projects to automatically generate a novel and successful team, taking various constraints such as key members, a budget and skill sizing as inputs. Generated teams are evaluated using sets of metrics to measure novelty and collective intelligence. Strategy matrices are used to predict team performance. Communication matrices may be used to select, for a given team, strategies and procedures for achieving project objectives.

Figure 1:
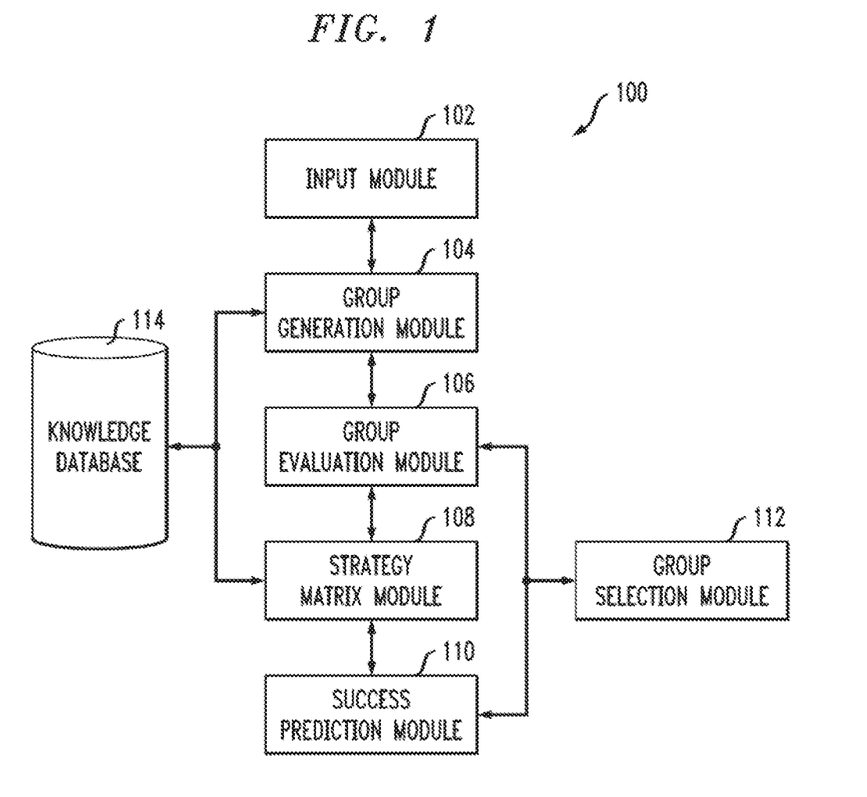
FIG. 1 depicts a system for group generation according to an embodiment of the invention.

FIG. 1 illustrates a system 100 for group generation. The system 100 includes an input module 102, a group generation module 104, a group evaluation module 106, a strategy matrix module 108, a success prediction module 110, a group selection module 112 and knowledge database 114. As will be described in further detail blow, each of the modules shown in system 100 may be implemented using hardware, software or a combination of hardware and software running on one or more computing or other processing devices.

As shown in FIG. 1, the group generation module 104 and strategy matrix module 108 are connected to knowledge database 114. The group generation module 104 and strategy matrix module 108 are each configured to query or otherwise exchange information with the knowledge database 114. While not explicitly shown in FIG. 1, other ones of the modules of system 100 may also be configured to query or exchange information with the knowledge database 114, either directly or through one of the group generation module 104 and strategy matrix module 108.

The knowledge database 114 stores information associated with group or team members, as well as information associated with previous or historical projects.

The information associated with team members in the knowledge database 114 includes skill levels, previous project roles, estimated costs, behavior metrics and social sensitivity metrics for predicting collective intelligence. The skill levels of a given team member may indicate professional qualifications, certifications, performance reviews, areas of expertise, etc. The previous project roles for a given team member may indicate job titles or descriptions of work done on previous projects. The estimated costs for a given team member may be that individual's salary and/or expenses. Social sensitivity metrics may be determined in a variety of ways. As one example, the "Reading the Mind in the Eyes" test may be used. The "Reading the Mind in the Eyes" test is described in Woolley et al., "Evidence for a Collective Intelligence Factor in the Performance of Human Groups," Science, Vol. 330, 686 (2010), which is incorporated by reference herein. Various behavior metrics and tests may be used. The DISC assessment or a Meyers-Briggs assessment may be used to determine personality types, for example.

The information associated with previous projects in the knowledge database 114 may include lists of group members, quantified outcomes, lists of project roles, metrics measuring member interactions, etc. Consider, as one example, a sports game for which the knowledge database 114 may store lists of players on each team, the positions for each player, the score or outcome of the game, lists of plays in the game, etc. As another example, consider an enterprise project for which the knowledge database may store the list of employees on the project, the respective roles of the employees, project success Key Performance Indicators (KPIs), etc.

Figure 2:
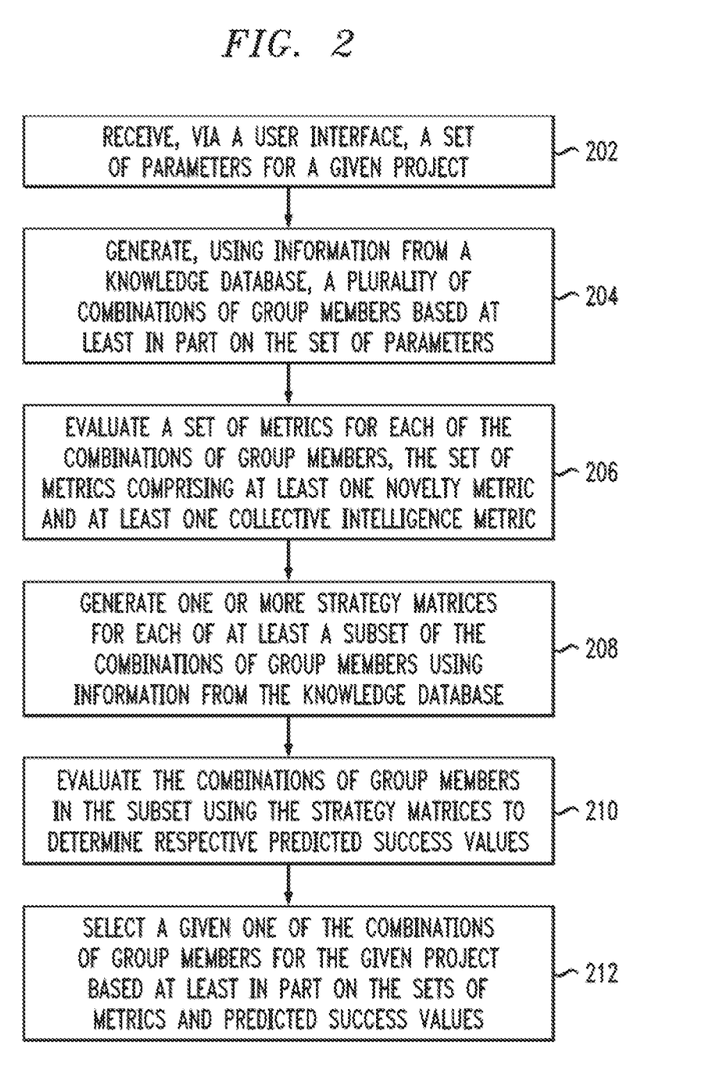
FIG. 2 depicts a process for group generation according to an embodiment of the invention.

FIG. 2 illustrates a process 200 for group generation. The process 200 may be implemented using the system 100. The process 200 begins with receiving, via a user interface, a set of parameters for a given project in step 202. Step 202 may be performed by the input module 102 of system 100. The set of parameters can include one or more user-specific parameters and one or more system-generated parameters. Although described in the process 200 as being received via a user interface, the set of parameters may be received in other embodiments at least partially via other techniques. As an example, if a given project is generating a sports team, one or more parameters may be known without explicit user input. For example, various sporting leagues have different requirements relating to the number of roster spots, position limits, salary cap, etc. These parameters may be preprogrammed for a given system rather than being specified by a user via a user interface.

In some embodiments, the set of parameters includes project goals, group member constraints and budget constraints. Project goals may be varied. In an enterprise, for example, a research project may have a goal of getting results published in a journal, obtaining intellectual property rights, creating a new product or service, fixing issues with an existing product or service, modifying an existing product or service, etc. A particular project may have multiple goals. Consider, for example, a sports team. One goal of the sports team may be to win a certain percentage of games, to qualify for a playoff berth or to win a championship, tournament or individual contest. Another goal of the sports team may be to create an exciting style of play to increase fan engagement.

Figure 4:
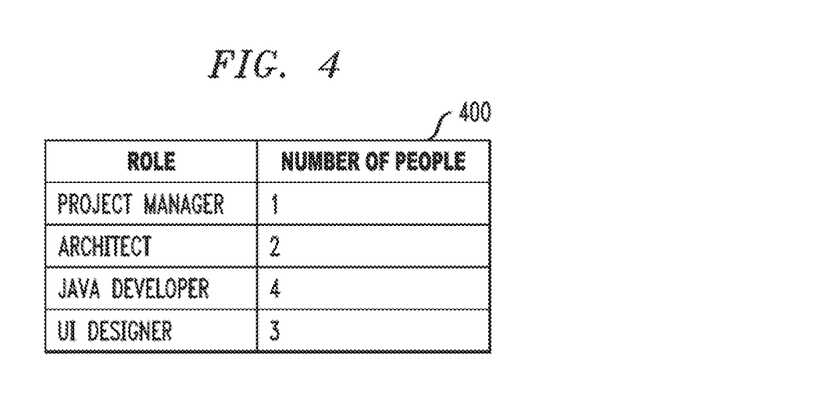
FIG. 4 depicts a skill list and sizing table according to an embodiment of the invention.
Figure 5:
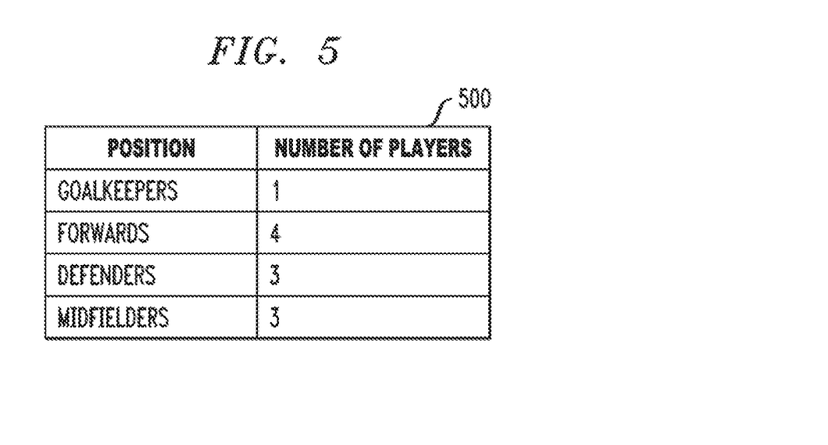
FIG. 5 depicts another skill list and sizing table according to an embodiment of the invention.

Group member constraints may specify project roles and the number of group members required for each project role. FIGS. 4 and 5, which will be discussed in further detail below, show two examples of skill list and sizing tables which may be used for specifying project roles and the number of group members for each project role. Group member constraints may also specify, for each group member of a given project, various familiarity constraints.

In some embodiments, it may be advantageous for at least some of the group members to have worked together in the past to increase collaboration efficacy and reduce communication cost. The familiarity constraints may therefore specify, for each member of a group, a minimum number of other group members which that group member has worked with on one or more historical projects that should be included in a generated group. As discussed above, however, restricting an entire team solely to other members that have worked together in the past can decrease team diversity and have a negative effect on team performance. The familiarity constraints may thus also or alternatively specify, for each member of a group, a maximum number of other group members which that group member has worked with on one or more historical projects that should be included in a generated group.

Familiarity constraints may also be specific to particular group roles, or across group roles. For example, consider a soccer team has eleven starting spots to fill with a combination of different positions such as a goalkeeper, defenders, midfielders and forwards. It may be advantageous for particular team members at the different positions to have more or less familiarity with one another. A team may be particularly strengthened by having a pair of central defenders or a pair of a holding and a creative midfielder that have significant knowledge of one another's tendencies. Thus, a familiarity constraint may be tied to position, or more generally a group role. Certain positions on a team may also be strongly linked. For example, a creative midfielder and a center-forward with deep familiarity may be advantageous. Thus, familiarity constraints may also link different roles.

Budget constraints may vary depending on context. For example, various sporting leagues have salary caps. The budget constraints may specify that the sum of player salaries not exceed the salary cap or some percentage of the salary cap or a team budget. Budget constraints may also be tied to particular project roles. For example, a soccer team may have different budgets for different position groups. An enterprise may also have budget constraints. Various employees may be paid different wages, and the project as a whole may specify the total wages, pay or time to be spent on a project for the group members collectively, or for particular project roles.

The process 200 continues with step 204, generating, using information from a knowledge database, a plurality of combinations of group members based at least in part on the set of parameters received in step 202. Step 204 may be performed by the group generation module 104 in system 100 using information from knowledge database 114. In some embodiments the knowledge database may include a very large number such as hundreds, thousands or millions of possible group members. While step 204 may involve generating every possible combination of group members, it may be more practical based on available computing power and resources to generate a specific number of possible combinations of group members rather than every possible combination of group members. Possible combinations of team members are limited by the set of parameters received in step 202. The above-described group member constraints and budget constraints, for example, may be used to limit the possible combinations of group members.

Step 206 of process 200 is evaluating a set of metrics for each of the combinations of group members, the set of metrics including at least one novelty metric and at least one collective intelligence metric. Step 206 may be performed by group evaluation module 106 in system 100.

In some embodiments, novelty may be quantified using Bayesian surprise. Novelty can be quantified by considering a prior probability distribution of existing or historical group member compositions and the change in that probability distribution after a new team is observed, i.e., the posterior probability. Let $\mathcal{M}$ be a set of groups known to an observer, let $M \in \mathcal{M}$ be a group in the set of known groups and let A be a new group being observed. The Bayesian surprise can be calculated using the following equation:

$$\text{surprise} = \int_{\mathcal{M}} p(M\,|\,A) \log \frac{p(M\,|\,A)}{p(M)} dM \tag{1}$$

where p denotes a probability distribution function.

In other embodiments, novelty metrics may be calculated or quantified using other techniques in addition to or as an alternative to using Bayesian surprise. User feedback, for example, may be used for determining novelty.

Collective intelligence metrics may include various psychometrics for objectively measuring skills, knowledge, abilities, attitudes and personality traits. The above-described social sensitivity and behavior metrics are examples of collective intelligence metrics.

Process 200 continues with step 208, generating one or more strategy matrices for each of at least a subset of the combinations of group members using information from a knowledge database. Step 208 may be performed by strategy matrix module 108 in system 100. In some embodiments, strategy matrices are generated for only a subset of the combinations of team members generated in step 204. The set of metrics evaluated in step 206 may be used to narrow down the possible combinations of team members so as to reduce the number of strategy matrices that must be generated. In other embodiments, strategy matrices are generated for all combinations of team members generated in step 204. Strategy matrices can be defined by team composition, and include role-behavior matrices, role-experience matrices and communication matrices. Strategy matrices will be discussed in further detail below in conjunction with the examples shown in FIGS. 6-8.

In step 210 of process 200, the combinations of group members in the subset are evaluated using the strategy matrices to determine respective predicted success values. Step 210 may be performed by success prediction module 110 in system 100. Evaluating the predicted success value of a combination of group members for a given project may include using a machine learning algorithm and at least one of the strategy matrices. Each matrix cell can be used as a feature in the machine learning algorithm. Alternatively, structural motifs and subgraph distributions may be used as features in the machine learning algorithm. Various machine learning algorithms may be used, including but not limited to clustering algorithms, nearest neighbor algorithms, regression algorithms and support vector machine (SVM) algorithms.

Process 200 continues with step 212, selecting a given one of the combinations of group members for a given project based at least in part on the sets of metrics and the predicted success values. Step 212 may be performed by group selection module 112 in system 100. In some embodiments, as discussed above, the sets of metrics may be used to narrow down or filter the possible combinations of group members prior to steps 208 and 210. Thus, in some embodiments step 212 may be considered as comprising two stages. In a first stage, all possible combinations of group members are narrowed down into some subset by evaluating the novelty and collective intelligence metrics. In a second stage, one of the combinations in the subset is selected using the predicted success values.

In other embodiments, however, the sets of metrics and predicted success values are determined for all possible combinations of team members, and one of the combinations is selected at the end of process 200 using the metrics and the predicted success values. Different weights may be assigned to the metrics and predicted success values. Different weights may also be assigned to individual metrics. As an example, a group project may have the goal of coming up with an entirely new product. In this context, it may be particular advantageous to have a very novel group to come up with a new idea. As such, the novelty metric may have a higher weight relative to the collective intelligence metric and/or predicted success values when selecting one of the combinations of team members for the given project.

It is important to note that although process 200 describes selecting a single combination of team members, embodiments are not limited to selecting a single combination of team members for a given project. As an example, an enterprise may have multiple groups working on a given project. To solve a particular problem or come up with a novel solution, for example, it may be advantageous to have multiple groups working independently of one another. Thus, step 212 of process 200 may include selecting multiple combinations of group members for a given project. Step 212 may also include selecting different types of groups. Consider, for example, an enterprise having a contract for designing a new advertising campaign. The enterprise may wish to have different types of groups work on developing different options for the advertising campaign. The different types of groups may be selected by assigning varying weights to the metrics and predicted success values.

Figure 3:
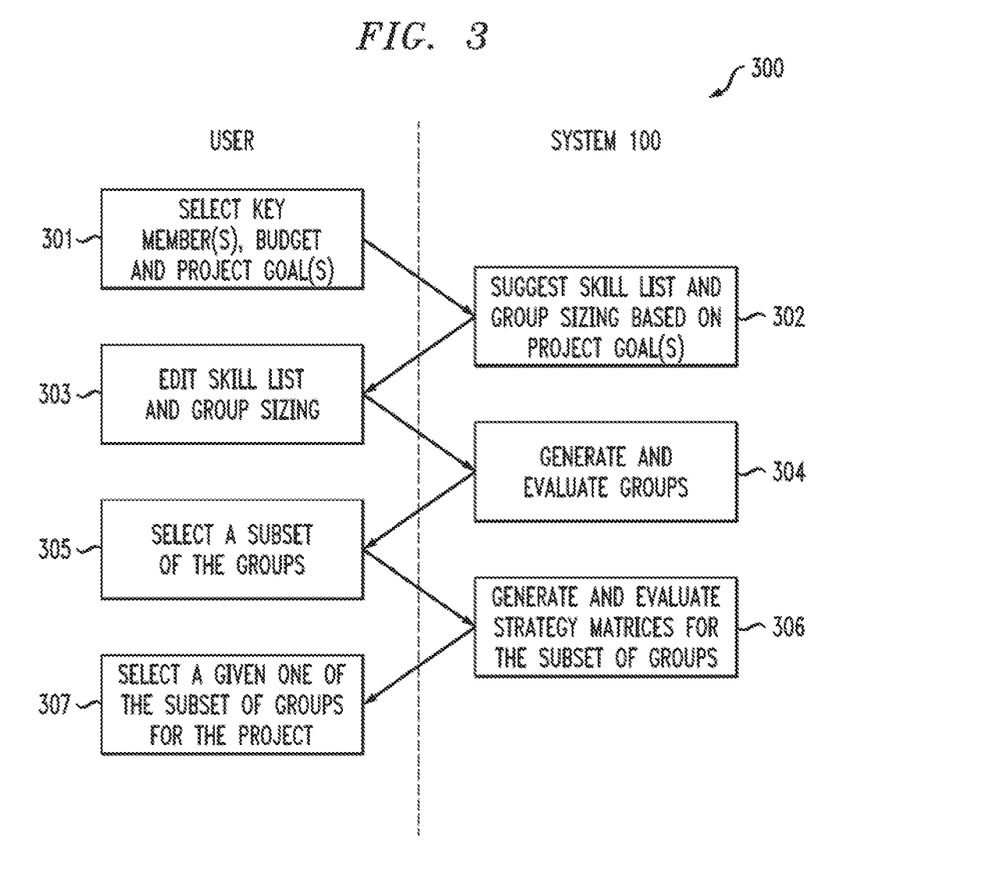
FIG. 3 depicts another process for group generation according to an embodiment of the invention.

FIG. 3 depicts a process 300 for group generation, performed by the system 100 based on user input. The process 300 begins with step 301, where the user selects certain parameters such as key members, a budget and project goals for a particular project. A key member or members may be individuals which should or should not be selected in each possible combination of group members for a given project. These parameters may be entered via a user interface and received by the system 100 via input module 102. Based on the project goals, the system 100 suggests a skill list and group sizing in step 302. The system 100 may use information from knowledge database 114 for past or historical projects with similar goals to suggest the skills needed and number of individuals for each role in a project. The input module 102 of system 100 may present this suggested information to the user via input module 102.

In step 303, the user is given the option of editing the skill list and group sizing suggested by the system 100. In some embodiments, the user may be presented with two or more templates for skill lists and group sizing that are generated by the system 100, where the user selects between the different templates. In other embodiments, the user may be permitted to select one of the templates and make additional edits to the skill list and/or group sizing. In still other embodiments, the user may be presented with only one template, where the user is permitted to make edits to the skill list and/or group sizing. It is important to note, however, that a user is not required to make any edits to the skill list and/or group sizing suggested by the system 100. In other processes, step 303 may be omitted, and the system 100 may select on its own the skill list and group sizing without additional user input.

FIGS. 4 and 5 show two examples of skill lists and group sizing tables in the context of a software coding project and a soccer team, respectively. FIG. 4 shows table 400, which includes the skills or project roles and the number of people for each project role. In table 400, there are four project roles—project manager, architect, Java developer and user interface (UI) designer. As shown in table 400, this particular example has group sizings of one project manager, two architects, four Java developers and three UI designers. The table 400 may be presented to a user, and the user may be permitted to adjust the respective group sizes for the different roles. The user may also be permitted to add or remove project roles.

FIG. 5 shows a table 500 showing the skill list and sizing for a soccer team. The soccer team has four broad categories of positions, including goalkeepers, forwards, defenders and midfielders having sizes of one, four, three and three members respectively. As noted above, a user may be permitted to add or remove project roles. As an example, a user may decide to subdivide the position group of midfielders into holding or defensive midfielders and creative or attacking midfielders.

The process 300 continues with step 304, generating and evaluating groups. Step 304 may involve evaluating sets of metrics for different possible combinations of team members in a manner similar to that described above with respect to steps 204 and 206 in process 200. The system 100 may provide the results of such evaluations to the user, allowing the user to select a subset of the possible groups using such evaluations in step 305. In step 306, the system 100 generates and evaluates strategy matrices for the subset of groups selected by the user in step 305 in a manner similar to that described above in steps 208 and 210 of process 200. In step 307, the user selects a given one of the subset of groups for the project. In some embodiments, step 307 may be performed by the system 100 rather than the user.

Figure 6:
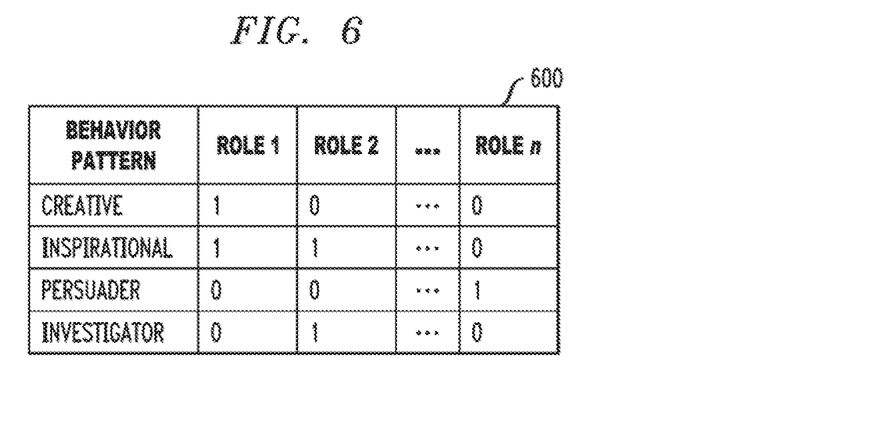
FIG. 6 depicts a role-behavior strategy matrix according to an embodiment of the invention.
Figure 7:
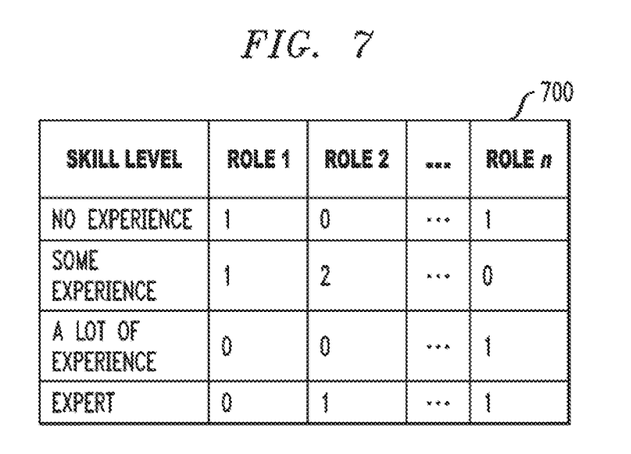
FIG. 7 depicts a role-experience strategy matrix according to an embodiment of the invention.

FIGS. 6 and 7 show two examples of strategy matrices. FIG. 6 shows a role-behavior strategy matrix 600 while FIG. 7 shows a role-experience strategy matrix 700. Role-behavior strategy matrix 600 shows roles 1 through n and various behavior patterns including creative, inspirational, persuader, investigator and objective thinker. It is important to note that behavior patterns used in embodiments of the invention are not limited solely to the behavior patterns shown in role-behavior strategy matrix 600. Instead, various other behavior patterns may be used in addition to or in place of the behavior patterns shown in role-behavior strategy matrix 600.

Each role in role-behavior strategy matrix 600 is assigned a value of 1 or 0 for each behavior pattern indicating whether or not that role exhibits that particular behavior pattern. The values assigned may be binary indicators. Thus, role-behavior strategy matrix 600 shows that group members in role 1 are both creative and inspirational, while group members in role 2 are inspirational, investigators and objective thinkers. The values in role-behavior may alternatively indicate the respective numbers of group members having particular behavior patterns. For example, role-behavior strategy matrix 600 may alternatively show that there is one group member in role 1 that is creative and one group member in role 1 that is inspirational.

The values assigned to cells in role-behavior strategy matrix 600 need not be integer values. Instead, the values assigned may be respective percentages. For example, each of the group members in a given role or the group members collectively in a given role may be 45% creative, 55% inspirational and 10% persuasive. Values assigned may be between 0 and 1 where the sum for a particular role is equal to 1. Values assigned to different behavior patterns may also be a numerical value between some range, i.e., between 1 and 10 or between 1 and 100 where the total values need not sum to any particular value. Roles may also be assigned alphabetic grades.

Role-experience strategy matrix 700 again shows roles 1 through n, but instead of behavior patterns it includes experience levels including no experience, some experience, a lot of experience and expert. Again, it is important to note that embodiments are not limited solely to strategy matrices using the particular experience levels shown in role-experience strategy matrix 700. The values assigned to each cell in role-experience strategy matrix 700 indicate the number of group members in different ones of the roles that have the respective experience levels. Thus, as shown in role-experience strategy matrix 700, for role 1 there is one group member having no experience and one group member having some experience. For role 2, there are two group members having some experience and one group member that is an expert. As noted above with respect to role-behavior strategy matrix 600, the values assigned to cells in role-experience strategy matrix 700 need not be integer values, but may instead be percentages, numbers selected from various ranges, alphabetic grades, etc.

Success scores may be assigned to different strategy matrices based on known teams for historical projects in the knowledge database. The knowledge database may be searched for similar historical projects with different quantified outcomes. The outcome of a historical project may be quantified in a variety of ways. For example, each historical project can be simply marked as successful or not successful. Different gradations may also be used, such as unsuccessful, mostly unsuccessful, average, mostly successful and successful. Various other ways to assign success values may be used, including using numerical or alphabetic grades.

Strategy matrices for historical projects may be analyzed to determine, for different quantified outcomes, the respective distributions of cell values. In this way, one can predict the success of a strategy matrix for a new combination of group members by comparing its distribution of cell values to known distributions for historical projects having quantified outcomes. As discussed above, predicted success of a combination of group members may be evaluated using machine learning algorithms and one or more strategy matrices.

In some embodiments, strategy matrices may be used in other ways to predict success which are not based on strategy matrices associated with historical projects. These techniques may be used in addition to or in place of predicting success using strategy matrices for historical projects. As an example, some general rules may be used for predicting success. In the context of a role-behavior strategy matrix, it may be desired that the various roles cover different behavior patterns. One rule or requirement may be that the role-behavior matrix for a selected group should include at least one member in each of at least a subset of the behavior patterns. Thus, for example, it may be required that a combination of team members should have a role-behavior matrix with at least one member exhibiting the behavior patterns of creative, inspirational, persuasive, investigative and objective. In the context of a role-experience matrix, one rule may be that, for a given role, there should be a mix of experience levels or that there should not be solely experts or solely those with no experience in a particular role. Various other rules and constraints may be used for predicting success using strategy matrices.

FIGS. 6 and 7 show only two examples of strategy matrices which may be used in embodiments of the invention. Some embodiments may use other types of strategy matrices in addition to or in place of role-behavior or role-experience strategy matrices. Examples of such additional strategy matrices include, but are not limited to, role-gender matrices, role-age matrices, role-education matrices, etc. In the context of a sports team, various types of strategy matrices may be used for measuring athletic attributes such as speed, jumping ability, strength, etc.

In some embodiments, the process 200 or the process 300 may further involve generating communication matrices for one or more combinations of group members. Communication matrices are a type of strategy matrix that represent respective sequences of actions for a given project that correspond to different strategies for the given project. For example, given a selected roster for a sports team, communication matrices may be generated and evaluated to determine an appropriate style of play that is likely to be successful. To predict the success of different strategies, the generated communication matrices for a selected combination of team members may be compared to historical communication matrices for historical projects.

Figure 8:
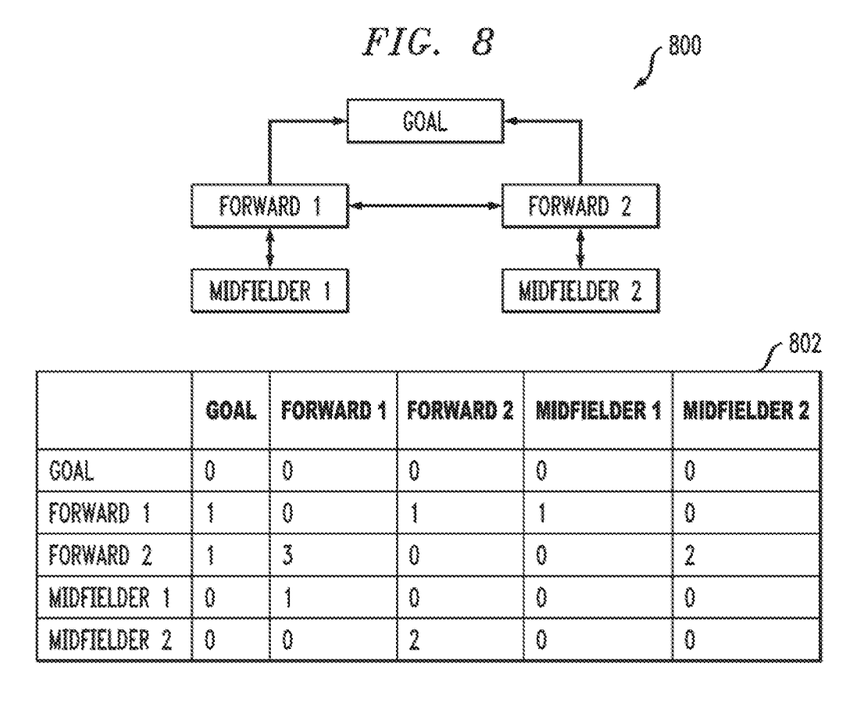
FIG. 8 depicts a sequence and its corresponding communication matrix according to an embodiment of the invention.

FIG. 8 shows an example of a communication matrix 802 for a soccer team. Chart 800 shows the passes between players on a soccer team. The players at the positions denoted forward 1, forward 2, midfielder 1 and midfielder 2 pass the ball as shown with the objective of scoring a goal for one or more sequences of passes. Communication matrix 802 has cells indicating the passes between players from chart 800 for one or more sequences during a game. A game may be decomposed into sequences, where each sequence can be assigned a score. The scores may be positive, negative or neutral. Alternatively, the scores may be numerical values, alphabetic grades, etc. As an example, in a soccer game a sequence of passes between players that results in a goal may be awarded a positive score while a sequence of passes that results in lost possession in the offensive zone may be given a neutral score and a sequence of passes that results in lost possession in the defensive zone may be given a negative score.

The cells in communication matrix 802 indicate how often players pass to one another. In the specific example shown in FIG. 8, the cell of communication matrix 802 show the number of passes between two positions for a particular sequence. The values of cells in a communication matrix, however, may alternatively indicate the frequency of passes between positions, the proportion of passes from one position to other ones of the positions, etc.

Communication matrices may be more complex than the particular example communication matrix 802 shown in FIG. 8. Continuing with the soccer example, a communication matrix may include players on both teams. Other elements may be added for other results in a soccer game other than a goal. A shot on target, while not given the same positive score as a goal, may nonetheless be an advantageous result. Similarly a shot that is off target may be given a positive score that is less than the scores for an on-shot target or a goal. A sequence that ends with the ball out of bounds and results in a throw-in may result in a positive score for the team gaining possession and a negative score for the team losing possession. Sequences that end with the ball out of bounds for a throw-in may be further broken down based on the distance to goal. For example, obtaining a throw-in near the opponent's goal could be awarded a higher score than obtaining a throw-in near midfield. Sequences that end with a goal kick or corner kick may similarly be awarded positive and negative scores for the teams gaining, maintaining or losing possession.

A knowledge database such as knowledge database 114 may include numerous communication matrices for sequences in past projects. Communication matrices for past projects can be assigned scores used for predicting the success of sequences with a new team. As noted above with respect to other types of strategy matrices, machine learning algorithms may be used for predicting the success or riskiness of a particular plan or strategy for a given group based on one or more communication matrices. Features used in the machine learning algorithm may be individual matrix cells in the communication matrices or paths between cells in communication matrices.

Although communication matrices have been discussed above primarily in the context of a sports team, communication matrices may also be used in other contexts. For example, enterprise projects may involve different sequences of actions between group members in different roles. Similar to the soccer examples above, different sequences of actions may be assigned different scores which may be used for predicting the success of different strategies or work plans for the enterprise project. Consider, as an example, a sequence of actions between members of a software development project having the roles of project manager and architects. The project manager and architects may communicate for obtaining a broad overall plan for a piece of software. For coding and implementing the design, increased communication amongst Java developers and UI designers may be shown to be particular successful relative to increased communication amongst the project manager and UI designers or Java developers. These non-limiting examples are provided solely for illustration. Various other examples of communication matrices and strategies may be used in different contexts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
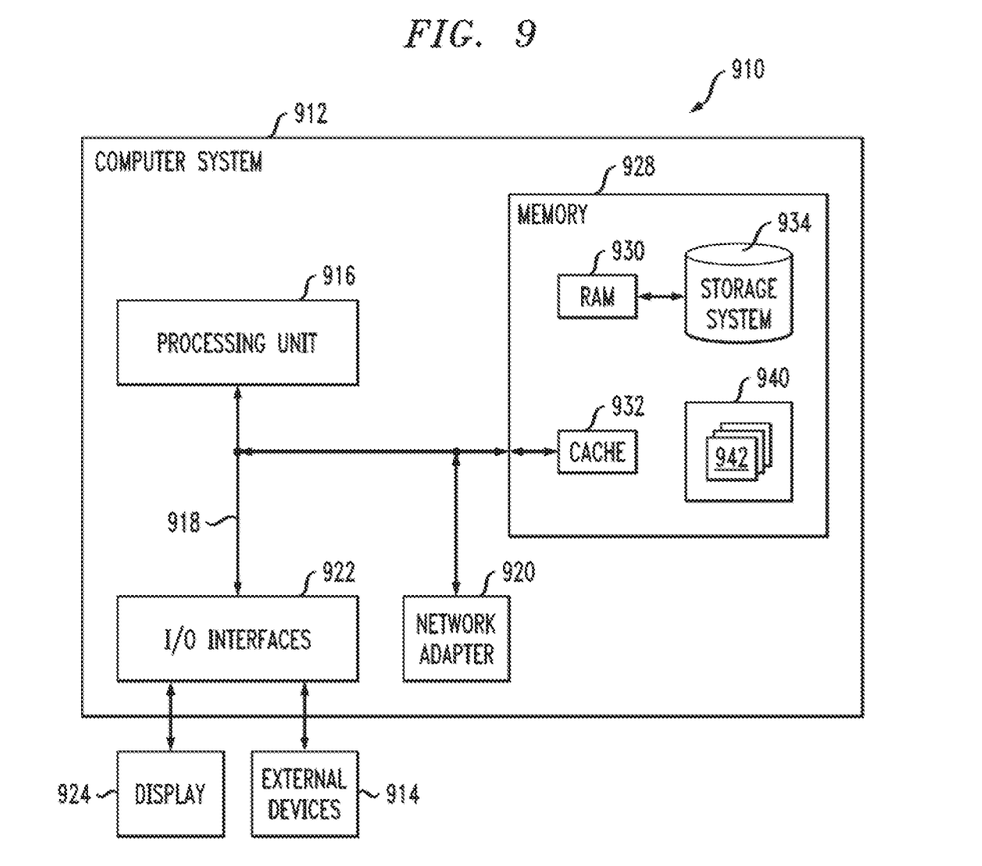
FIG. 9 depicts a computer system in accordance with which one or more components/steps of techniques of the invention may be implemented according to an embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as RAM 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via Input/output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples include, but are not limited to, microcode, device drivers, redundant processing units, external disk drive arrays, RAID systems, tape drives, and data archival storage systems, etc.

The flowchart and block diagrams in FIGS. 1-9 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. In addition, particular features described above with respect to a particular embodiment of the invention are not necessarily limited solely to use in the particular embodiment described. Instead, a single embodiment may include features described above in the context of two or more different embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a set of parameters for a given project;
generating, using at least a first portion of information from a knowledge database, a plurality of combinations of group members based at least in part on the set of parameters;
generating one or more strategy matrices for each of at least a subset of the plurality of combinations of group members using at least a second portion of the information from the knowledge database;
evaluating the plurality of combinations of group members in the subset to determine respective predicted success values, wherein evaluating the plurality of combinations of group members in the subset comprises utilizing values in one or more cells of at least one of the one or more strategy matrices as features input to one or more machine learning algorithms; and
selecting a given one of the plurality of combinations of group members for the given project based at least in part on the predicted success values;
wherein the method is performed by at least one processing device comprising a processor coupled to a memory.

2. The method of claim 1, wherein the set of parameters for the given project comprises one or more project goals and one or more group member constraints.

3. The method of claim 2, wherein the set of parameters for the given project further comprises at least one budget constraint.

4. The method of claim 2, wherein the one or more group member constraints specify project roles and a number of group members for each of the project roles.

5. The method of claim 2, wherein the one or more group member constraints specify, for each group member for the given project, at least one of:
a minimum number of other group members which that group member has worked with on one or more historical projects to be included in each of the plurality of combinations of group members; and
a maximum number of other group members which that group member has worked with on one or more historical projects to be included in each of the plurality of combinations of group members.

6. The method of claim 1, wherein the knowledge database comprises information associated with a plurality of possible group members comprising one or more of skill levels, previous project roles, estimated costs, behavior metrics and social sensitivity metrics for predicting collective intelligence.

7. The method of claim 1, wherein the knowledge database comprises information associated with a plurality of historical projects comprising one or more of lists of group members, quantified outcomes, project roles and metrics measuring member interactions.

8. The method of claim 1, further comprising evaluating a set of metrics for each of the plurality of combinations of group members, the set of metrics being utilized in selecting the given combination of group members for the given project.

9. The method of claim 8, wherein the set of metrics comprises at least one novelty metric comprising a Bayesian surprise metric calculated according to:

$$\int_{\mathcal{M}} p(M\mid A)\log\frac{p(M\mid A)}{p(M)}dM$$

where $\mathcal{M}$ is a set of groups known to an observer, $M\in\mathcal{M}$ and A is a new group being observed and p denotes a probability distribution function.

10. The method of claim 8, wherein the set of metrics comprises at least one collective intelligence metric, the at least one collective intelligence metric comprising psychometrics for objectively measuring skills, knowledge, abilities, attitudes and personality traits.

11. The method of claim 1, wherein at least one of the one or more strategy matrices comprises a role-behavior matrix mapping a set of behavior patterns to roles of group members.

12. The method of claim 1, wherein at least one of the one or more strategy matrices comprises a role-experience matrix mapping a set of skill levels to roles of group members.

13. The method of claim 1, wherein at least one of the one or more strategy matrices comprises a communication matrix mapping sequences of actions to roles of group members.

14. The method of claim 1, wherein the one or more machine learning algorithms comprise one or more of a clustering algorithm, a nearest neighbor algorithm, a regression algorithm and a support vector machine (SVM) algorithm.

15. The method of claim 1, further comprising:
generating a plurality of communication matrices for the given combination of group members, each of the plurality of communication matrices representing a sequence of actions for the given project corresponding to one or more strategies for the given project; and
predicting the success of the one or more strategies for the given project based on a comparison of one or more of the plurality of communication matrices and one or more historical communication matrices for historical projects.

16. The method of claim 15, wherein predicting the success of the one or more strategies for the given project comprises utilizing values in one or more cells of at least one of the plurality of communication matrices as features input to the one or more machine learning algorithms.

17. The method of claim 1, wherein the given project comprises a sports game, the group members comprises players on a sports team, the predicted success values comprises game scores and the set of parameters comprises a set of project roles identifying positions for the sports team and a salary cap for the sports team.

18. The method of claim 1, wherein the given project comprise an enterprise project, the group members comprises employees or partners of the enterprise, the predicted success values comprise key performance indicators (KPIs)

and the set of parameters comprises a set of project roles identifying job descriptions for the project and a project budget.

19. An article of manufacture comprising a computer readable storage medium for storing computer readable program code which, when executed, causes a computer:
  to receive a set of parameters for a given project;
  to generate, using at least a first portion of information from a knowledge database, a plurality of combinations of group members based at least in part on the set of parameters;
  to generate one or more strategy matrices for each of at least a subset of the plurality of combinations of group members using at least a second portion of the information from the knowledge database;
  to evaluate the plurality of combinations of group members in the subset to determine respective predicted success values, wherein evaluating the plurality of combinations of group members in the subset comprises utilizing values in one or more cells of at least one of the one or more strategy matrices as features input to one or more machine learning algorithms; and
  to select a given one of the plurality of combinations of group members for the given project based at least in part on the predicted success values.

20. An apparatus comprising:
  at least one processing device comprising a processor coupled to a memory;
  the at least one processing device being configured:
  to receive a set of parameters for a given project;
  to generate, using at least a first portion of information from a knowledge database, a plurality of combinations of group members based at least in part on the set of parameters;
  to generate one or more strategy matrices for each of at least a subset of the plurality of combinations of group members using at least a second portion of the information from the knowledge database;
  to evaluate the plurality of combinations of group members in the subset to determine respective predicted success values, wherein evaluating the plurality of combinations of group members in the subset comprises utilizing values in one or more cells of at least one of the one or more strategy matrices as features input to one or more machine learning algorithms; and
  to select a given one of the plurality of combinations of group members for the given project based at least in part on the predicted success values.

* * * * *